(12) United States Patent
Lin

(10) Patent No.: US 6,975,364 B2
(45) Date of Patent: Dec. 13, 2005

(54) RADIO TELEVISION AND FREQUENCY MODULATION MONITOR TRANSMITTING RECEIVING CONTROL APPARATUS

(76) Inventor: Hui-Lin Lin, 2F., No. 13, Ming Te II Rd., Chi Tu, Keelung (TW)

(*) Notice: Subject to any disclaimer, the term of this patent is extended or adjusted under 35 U.S.C. 154(b) by 560 days.

(21) Appl. No.: 10/167,618

(22) Filed: Jun. 13, 2002

(65) Prior Publication Data

US 2003/0231258 A1 Dec. 18, 2003

(51) Int. Cl.$^7$ .............................................. H04N 7/00
(52) U.S. Cl. ........................................ 348/552; 725/81
(58) Field of Search ................................ 348/552, 553, 348/725, 723; 725/81, 83, 114, 123, 131, 725/133

(56) References Cited

U.S. PATENT DOCUMENTS

| | | | | |
|---|---|---|---|---|
| 5,012,350 A | * | 4/1991 | Streck et al. | 386/96 |
| 5,625,864 A | * | 4/1997 | Budow et al. | 725/82 |
| 5,708,961 A | * | 1/1998 | Hylton et al. | 725/81 |
| 5,828,403 A | * | 10/1998 | DeRodeff et al. | 725/131 |
| 5,880,721 A | * | 3/1999 | Yen | 725/81 |
| 5,936,660 A | * | 8/1999 | Gurantz | 725/71 |
| 5,940,387 A | * | 8/1999 | Humpleman | 370/352 |
| 6,047,175 A | * | 4/2000 | Trompower | 455/452.1 |
| 6,271,837 B1 | * | 8/2001 | Naiff | 715/716 |
| 6,481,013 B1 | * | 11/2002 | Dinwiddie et al. | 725/80 |
| 6,493,875 B1 | * | 12/2002 | Eames et al. | 725/81 |
| 6,545,722 B1 | * | 4/2003 | Schultheiss et al. | 348/552 |
| 6,798,459 B1 | * | 9/2004 | Izumi | 348/552 |

* cited by examiner

Primary Examiner—Paulos M. Natnael
(74) Attorney, Agent, or Firm—Varndell & Varndell, PLLC

(57) ABSTRACT

A radio television and frequency modulation monitor transmitting receiving control apparatus is constructed to include at least one receiving module respectively installed in a respective monitor controlled by a remote controller, and a radio television and frequency modulation transmitting control module connected to an audio video signal source, which can be a digital video disk player, cathode ray tube television, digital video disk game machine, digital video disk internet game machine, organic light emitting diode display, or notebook computer, and adapted for transmitting signal data from the remote controller through an infrared transceiver of each receiving module to the audio video signal source and transmitting audio video output signal from the audio video signal source to each receiving module for output through each monitor in which one of the at least one receiving module is installed.

16 Claims, 3 Drawing Sheets

RADIO TELEVISION AND FREQUENCY MODULATION MONITOR TRANSMITTING RECEIVING CONTROL APPARATUS

BACKGROUND AND SUMMARY OF THE INVENTION

The present invention relates to a radio television and frequency modulation monitor transmitting receiving control apparatus, which enables multiple monitors to be worked with a digital video disk player by radio for audio and video output.

Following fast development of the society, television and digital video disk player have become requisite home electric appliances. A family may have multiple televisions in different rooms or floors. It is expensive to install a digital video disk player in each room or floor where a television is available. Further, when several digital video disk players are used with respective televisions, the connecting cables must be properly arranged. A home video renter may encounter the same problem.

The present invention has been accomplished under the circumstances in view. It is the main object of the present invention to provide a radio television and frequency modulation monitor transmitting receiving control apparatus, which controls an audio video signal source (for example, a digital video disk player, video tape recorder, video camera, or the like) to output audio video signals to multiple monitors (that can be television and frequency modulation monitors, liquid crystal display, plasma television, cathode ray tube television, organic light emitting diode display, or the like) at different locations by radio. It is another object of the present invention to provide a radio television and frequency modulation monitor transmitting receiving control apparatus, which eliminates the installation of an external cable to each monitor for signal transmission. It is still another object of the present invention to provide a radio television and frequency modulation monitor transmitting receiving control apparatus, which eliminates the installation of a television tuner in each monitor for channel selection. According to the present invention, the radio television and frequency modulation monitor transmitting receiving control apparatus comprises at least one receiving module respectively installed in a respective monitor controlled by a remote controller, and a radio television and frequency modulation transmitting control module connected to an audio video signal source, which can be a digital video disk player, cathode ray tube television, digital video disk game machine, digital video disk Internet game machine, organic light emitting diode display, or notebook computer, and adapted for transmitting output signal from the audio video signal source to each receiving module for output through each monitor in which one of the at least one receiving module is installed. Each receiving module comprises an infrared receiver unit controlled by the remote controller to transmit signal data by infrared, and a radio television and frequency modulation receiver unit adapted for receiving audio video signals from the audio video signal source for output through the respective monitor. The radio television and frequency modulation transmitting control module comprises a circuit control panel having installed therein a television and frequency modulation modulator, a radio television and frequency modulation transmitter unit, and an infrared transceiver unit. The radio television and frequency modulation transmitter unit is connected to the audio video signal source by an audio/video connecting cord for audio video signal input, and controlled to transmit television and frequency modulation signal at the frequency of 1.8G~6.0G to the radio television and frequency modulation receiver unit of each of receiving module for output through the respective monitor. The infrared transceiver unit is adapted to receive signal data from the infrared transceiver of each receiving module, and to transmit received signal data to the audio video signal source for driving the video signal source to operate.

DETAILED DESCRIPTION OF THE PREFERRED EMBODIMENT

Figure 1:
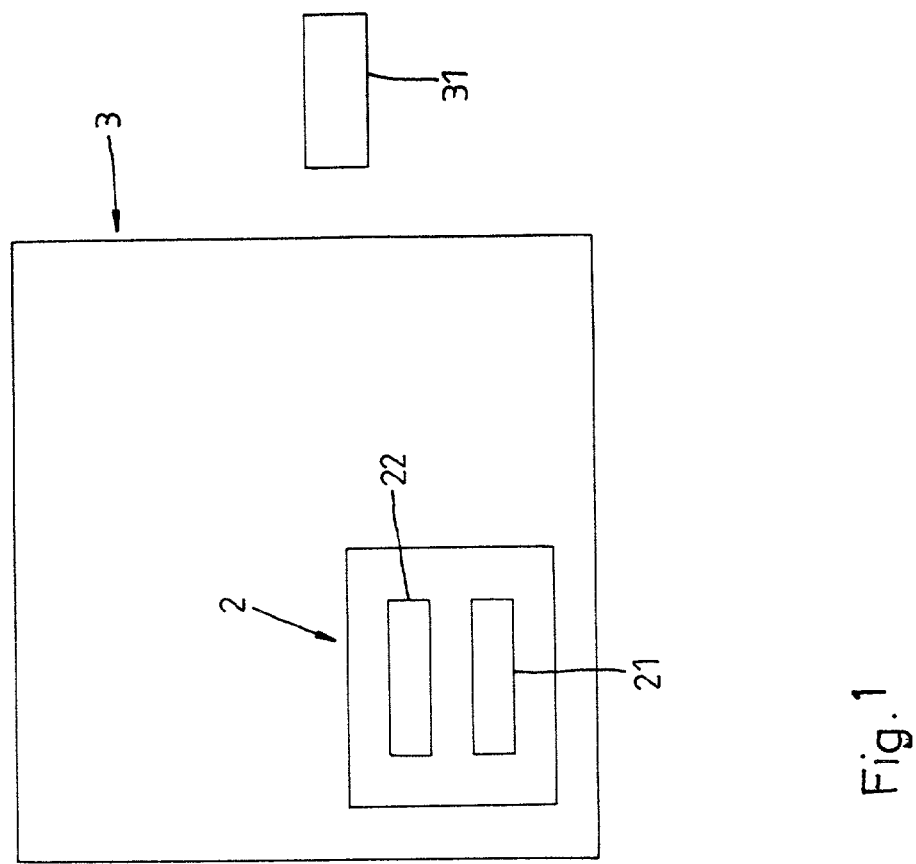
FIG. 1 is a plain view showing the arrangement of the radio television and frequency modulation monitor transmitting receiving control apparatus according to the present invention.
Figure 1:
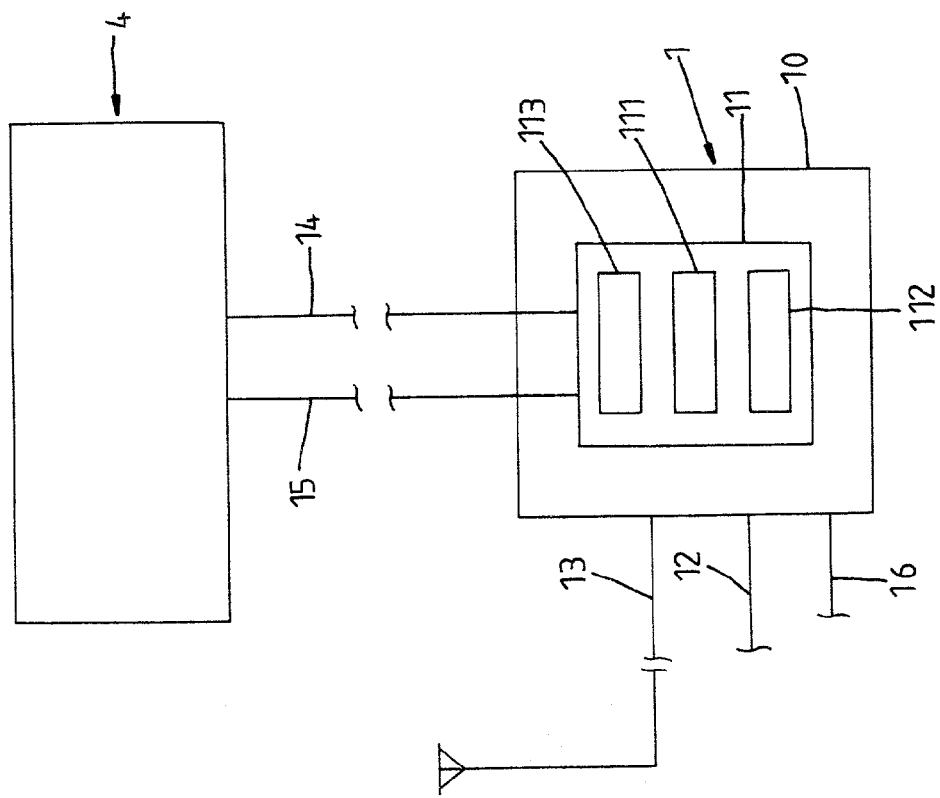
Figure 2:
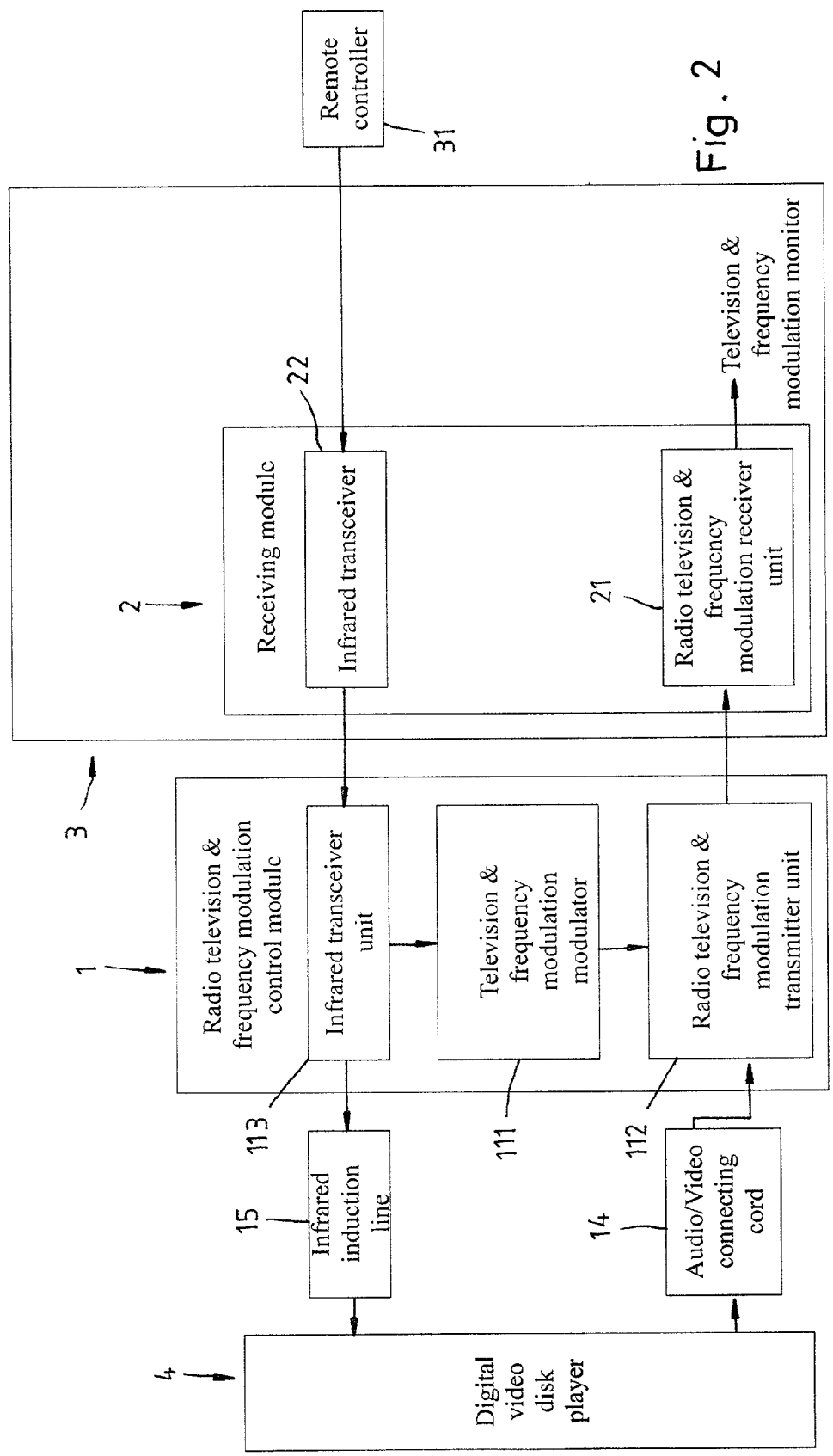
FIG. 2 is a system block diagram of the radio television and frequency modulation monitor transmitting receiving control apparatus according to the present invention.

Referring to FIGS. 1 and 2, a radio television and frequency modulation monitor transmitting receiving control apparatus in accordance with the present invention is shown comprised of a radio television and frequency modulation transmitting control module 1 connected to an audio video source 4, and a receiving control module 2 installed in a television and frequency modulation monitor 3. The audio video source 4 can be a digital video disk player, digital video disk game machine, digital video disk internet game machine, charge-coupled device video camera, video tape recorder, etc. According to the present preferred embodiment, the audio video source 4 is a digital video disk player.

The radio television and frequency modulation transmitting control module 1 comprises a circuit control panel 11 having installed therein a television and frequency modulation modulator 111, a radio television and frequency modulation transmitter unit 112, and an infrared transceiver unit 113. The radio television and frequency modulation transmitter unit 112 is controlled to transmit television and frequency modulation signal to the radio television and frequency modulation receiver unit 21 of the receiving module 2 in the television and frequency modulation monitor 3 at the frequency of 1.8G~2.4G or 2.4G~3.0G or 5.1G~6.0G. The infrared transceiver unit 113 is adapted to receive signal data from the infrared transceiver 22 of the receiving module 2 in the television and frequency modulation monitor 3.

The radio television and frequency modulation transmitting control module 1 further comprises a case 10, which receives the circuit control panel 11. By means of the case 10, the cable 12, the frequency modulation antenna 13, and the power cord 16 are conveniently connected to the circuit control panel 11 of the radio television and frequency modulation transmitting control module 1. Further, the circuit control panel 11 has an audio/video connecting cord 14 or S video cable (not shown) and an infrared induction line 15 connected to the digital video disk player 4. Photoelectric sensors may be respectively installed in the circuit control panel 11 and the digital video disk player 4 for signal data transmission from the infrared transceiver unit 113 to the digital video disk player 4 instead of the infrared induction line 15.

The radio television and frequency modulation receiver unit 21 of the receiving module 2 is adapted to receive signal from the radio television and frequency modulation transmitter unit 112 of the radio television and frequency modulation transmitting control module 1 for audio and video input. The infrared transceiver 22 of the receiving module 2 is adapted to receive signal data from the remote controller (or joystick) 31 of the television and frequency modulation monitor 3, and then to transmit received signal data to the infrared transceiver unit 113 of the radio television and frequency modulation transmitting control module 1 by infrared.

When the infrared transceiver 22 of the receiving module 2 received signal data from the remote controller 31 of the television and frequency modulation monitor 3, the infrared transceiver 22 immediately transmits received signal data to the infrared transceiver unit 113 of the radio television and frequency modulation transmitting control module 1 by infrared, the infrared transceiver unit 113 of the radio television and frequency modulation transmitting control module 1 in turn transmits received signal data to the digital video disk player through the infrared induction line 15, thereby causing the digital video disk player 4 to transmit signal to the television and frequency modulation modulator 111 of the radio television and frequency modulation transmitting control module 1 through the audio/video connecting cord 14 or S video cable, causing the television and frequency modulation modulator 111 to control the radio television and frequency modulation transmitter unit 112 to transmit audio and video signals to the radio television and frequency modulation receiver unit 21 of the receiving module 2 in the television and frequency modulation monitor 3 by radio at the frequency of 1.8G~6.0G for audio video output through the television and frequency modulation monitor 3.

The remote controller 31 of the television and frequency modulation monitor 3 has television/frequency modulation/play/game multiple function selection keys. Further, a regular cathode ray tube television, liquid crystal display, projector, plasma television, organic light emitting diode display, notebook computer, automobile television may be alternatively used instead of the television and frequency modulation monitor 3.

The receiving module 2 is installed in the television and frequency modulation monitor 3 during the fabrication of the television and frequency modulation monitor 3. The remote controller 31 is provided to the consumer buying the television and frequency modulation monitor 3. The radio television and frequency modulation transmitting control module 1 is also provided to the consumer buying the television and frequency modulation monitor 3. The radio television and frequency modulation transmitting control module 1 can also be directly installed in the digital video disk player, digital video disk game machine, digital video disk internet game machine, charge-coupled device video camera, or video tape recorder. The radio television and frequency modulation transmitting control module 1 and the receiving module 2 may be separately made and sold to the consumers.

As indicated above, the radio television and frequency modulation monitor transmitting receiving control apparatus of the present invention achieves the following advantages.

1. The monitor 3 needs not to be connected with a cable for signal input, keeping the surrounding area clean.
2. The monitor 3 eliminates the installation of a television tuner, saving much cost.
3. One digital video disk player (video tape recorder or video camera) can be used with multiple monitors 3 in different rooms or floors in a building. For example, a home video renter in a three-floor building can install multiple monitors in every floor of the building, and use a digital video disk player to play a video disk, enabling the audio and video signals of the digital video disk player to be outputted to every monitor.

Figure 3:
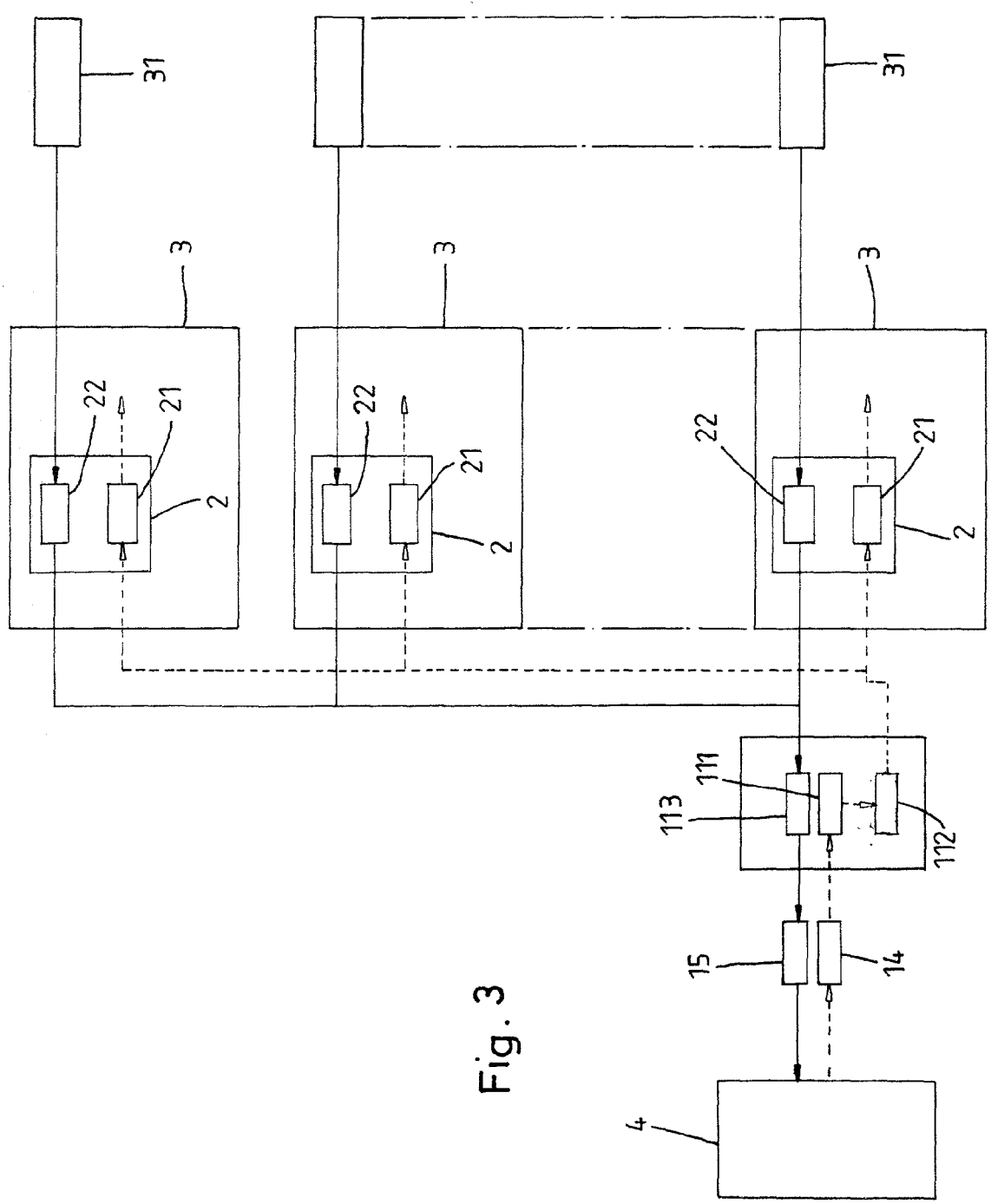
FIG. 3 is a schematic drawing showing an application example of the present invention.

A prototype of radio television and frequency modulation monitor transmitting receiving control apparatus has been constructed with the features of the annexed drawings of FIGS. 1~3. The radio television and frequency modulation monitor transmitting receiving control apparatus functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A radio television and frequency modulation monitor transmitting receiving control apparatus comprising:

at least one receiving module respectively installed in a respective monitor controlled by a remote controller, said at least one receiving module comprising an infrared receiver unit controlled by said remote controller to transmit signal data by infrared, and a radio television and frequency modulation receiver unit adapted for receiving audio video signals from an external source for output through the monitor in which the respective receiving module is installed; and a radio television and frequency modulation transmitting control module connected to an audio video signal source and adapted for transmitting output signal from said audio video signal source to each of said at least one receiving module for output through each monitor in which one of said at least one receiving module is installed, said radio television and frequency modulation transmitting control module comprising a circuit control panel having installed therein a television and frequency modulation modulator, a radio television and frequency modulation transmitter unit, and an infrared transceiver unit, said radio television and frequency modulation transmitter unit being connected to said audio video signal source by an audio/video connecting cord for audio video signal input and controlled to transmit television and frequency modulation signal at the frequency of 1.8G~6.0G to the radio television and frequency modulation receiver unit of each of said at least one receiving module for output through the respective monitor, said infrared transceiver unit adapted to receive signal data from the infrared transceiver of each of said at least one receiving module and to transmit received signal data to said audio video signal source for driving said video signal source to operate, and said infrared transceiver unit being connected to said audio video signal source by a first photoelectric sensor installed in said infrared transceiver unit of said radio television and frequency modulation transmitting control module and a second photoelectric sensor installed in said audio video signal source.

2. The radio television and frequency modulation monitor transmitting receiving control apparatus as claimed in claim 1, wherein said audio video signal source is a digital video disk player.

3. The radio television and frequency modulation monitor transmitting receiving control apparatus as claimed in claim 1, wherein said audio video signal source is a digital video disk game machine.

4. The radio television and frequency modulation monitor transmitting receiving control apparatus as claimed in claim 1, wherein said audio video signal source is a digital video disk internet game machine.

5. The radio television and frequency modulation monitor transmitting receiving control apparatus as claimed in claim 1, wherein said audio video signal source is a charge-coupled device video camera.

6. The radio television and frequency modulation monitor transmitting receiving control apparatus as claimed in claim 1, wherein said audio video signal source is a video tape recorder.

7. The radio television and frequency modulation monitor transmitting receiving control apparatus as claimed in claim 1, wherein said respective monitor is a respective television and frequency modulation monitor.

8. The radio television and frequency modulation monitor transmitting receiving control apparatus as claimed in claim 1, wherein said respective monitor is a cathode ray tube television.

9. The radio television and frequency modulation monitor transmitting receiving control apparatus as claimed in claim 1, wherein said respective monitor is an organic light emitting diode display.

10. The radio television and frequency modulation monitor transmitting receiving control apparatus as claimed in claim 1, wherein said respective monitor is the display module of a notebook computer.

11. The radio television and frequency modulation monitor transmitting receiving control apparatus as claimed in claim 1, wherein said respective monitor is an automobile television.

12. The radio television and frequency modulation monitor transmitting receiving control apparatus as claimed in claim 1, wherein said remote controller is a joystick.

13. The radio television and frequency modulation monitor transmitting receiving control apparatus as claimed in claim 1, wherein said radio television and frequency modulation transmitter unit is controlled to transmit television and frequency modulation signal at the frequency of 1.8G~2.4G.

14. The radio television and frequency modulation monitor transmitting receiving control apparatus as claimed in claim 1, wherein said radio television and frequency modulation transmitter unit is controlled to transmit television and frequency modulation signal at the frequency of 2.4G~3.0G.

15. The radio television and frequency modulation monitor transmitting receiving control apparatus as claimed in claim 1, wherein said radio television and frequency modulation transmitter unit is controlled to transmit television and frequency modulation signal at the frequency of 5.1G~6.0G.

16. The radio television and frequency modulation monitor transmitting receiving control apparatus as claimed in claim 1, wherein said infrared transceiver unit of said radio television and frequency modulation transmitting control module is connected to said audio video signal source by an infrared induction line.

* * * * *